United States Patent
Yuan et al.

(10) Patent No.: US 9,958,715 B2
(45) Date of Patent: May 1, 2018

(54) DISPLAY DEVICE FRAMEWORK AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jing Yuan, Beijing (CN); Guannan Song, Beijing (CN); Zhanchang Bu, Beijing (CN); Woong Kim, Beijing (CN); Tenglin Sun, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 14/906,473

(22) PCT Filed: Aug. 21, 2015

(86) PCT No.: PCT/CN2015/087763
§ 371 (c)(1),
(2) Date: Jan. 20, 2016

(87) PCT Pub. No.: WO2016/131232
PCT Pub. Date: Aug. 25, 2016

(65) Prior Publication Data
US 2016/0370640 A1 Dec. 22, 2016

(30) Foreign Application Priority Data
Feb. 16, 2015 (CN) .......................... 2015 1 0084070

(51) Int. Cl.
G02F 1/1333 (2006.01)
G06F 1/16 (2006.01)
G02F 1/1335 (2006.01)

(52) U.S. Cl.
CPC ...... *G02F 1/133308* (2013.01); *G06F 1/1601* (2013.01); *G06F 1/1637* (2013.01);
(Continued)

(58) Field of Classification Search
CPC .... G06F 1/1656; G06F 1/1601; G06F 1/1637; G02F 1/133308
See application file for complete search history.

(56) References Cited

U.S. PATENT DOCUMENTS 5,666,177 A * 9/1997 Hsieh ................ G02F 1/133512
349/106
2001/0017518 A1 8/2001 Mizutani et al.
(Continued)

FOREIGN PATENT DOCUMENTS

CN 101206338 A 6/2008
CN 102280072 A * 12/2011
(Continued)

OTHER PUBLICATIONS

First Chinese Office Action dated Sep. 1, 2016; Appln. No. 201510084070.4.
(Continued)

*Primary Examiner* — Nidhi Thaker
(74) *Attorney, Agent, or Firm* — Ladas & Parry LLP

(57) ABSTRACT

A display device framework and a display device, solving technical problem of application limitation of existing display device frameworks due to an integral structure thereof. The display device includes: a rear frame (20) configured to support at least a display panel (21); and a front frame (10) configured to support at least an out-cell panel (11), wherein, the front frame (10) and the rear frame (20) are flexibly connected so as to be movable with respective to each other along a first direction (101), wherein the first direction is perpendicular to a display panel (21) upon the display panel
(Continued)

(21) being supported. The display device includes at least the display device framework.

2 Claims, 3 Drawing Sheets

(52) U.S. Cl.
CPC ............... *G02F 1/133524* (2013.01); *G02F 2001/13332* (2013.01); *G02F 2001/133314* (2013.01); *G02F 2201/46* (2013.01)

(56) References Cited

U.S. PATENT DOCUMENTS

| | | | |
|---|---|---|---|
| 2007/0064410 A1 | 3/2007 | Ura et al. | |
| 2007/0115401 A1* | 5/2007 | Tsubokura | G02F 1/1333 349/58 |
| 2012/0008258 A1* | 1/2012 | Hsu | G06F 1/1656 361/679.01 |
| 2013/0128417 A1* | 5/2013 | Wang | H04M 1/0249 361/679.01 |
| 2013/0147930 A1* | 6/2013 | Hirai | H04N 13/04 348/54 |
| 2015/0198977 A1* | 7/2015 | Takizawa | G06F 1/1643 345/173 |
| 2015/0268698 A1* | 9/2015 | Hofmann | G06F 1/182 455/575.8 |
| 2016/0011411 A1 | 1/2016 | Wang et al. | |

FOREIGN PATENT DOCUMENTS

| | | |
|---|---|---|
| CN | 202855226 U | 4/2013 |
| CN | 103140092 A | 6/2013 |
| CN | 103152590 A | 6/2013 |
| CN | 103941456 A | 7/2014 |
| CN | 104090378 A | 10/2014 |
| CN | 104575279 A | 4/2015 |

OTHER PUBLICATIONS

International Search Report and Written Opinion both dated Nov. 11, 2015; PCT/CN2015/087763.

Second Chinese Office Action dated Apr. 25, 2017; Appln. No. 201510084070.4.

The Third Chinese Office Action dated Sep. 29, 2017; Appln. 201510084070.4.

* cited by examiner

DISPLAY DEVICE FRAMEWORK AND DISPLAY DEVICE

FIELD

Embodiments of the present invention relate to a display device framework and a display device.

BACKGROUND

View angle has become one of the major parameters to be improved for current display device technologies. For example, In-Plane Switching (IPS) technology and Multi-domain Display (MD) technology are adopted to expand a view angle of a display device. Existing wide-angle liquid crystal display (LCD) devices usually have a relatively broader view angle which allows contents displayed on the LCD being clearly observed within a range of about 178°.

However, under certain specific circumstances such as subway, bus and elevator, users may not expect the contents displayed on his/her display device to be observed by other people for consideration of privacy, especially when a wide-angle display that involves matter of privacy is used. Furthermore, it's usually very difficult for some well-known display devices such as mobile phone to adjust the view angle thereof by mechanical means due to integral design requirements for portability.

SUMMARY

On one aspect, at least one embodiment of the present invention provides a display device framework, comprising: a rear frame configured to support at least a display panel; and a front frame configured to support at least an out-cell panel, wherein the front frame and the rear frame are flexibly connected so as to be movable with respective to each other along a first direction, and the first direction is perpendicular to the display panel when supported on the rear frame.

In an example, the front frame and the rear frame are detachably connected.

In an example, the front frame and the rear frame are flexibly connected through a plurality of connectors which are disposed at corresponding locations on the front frame and the rear frame respectively.

In an example, the connector comprises support portions configured to provide a predetermined space between the front frame and the rear frame, wherein the predetermined space is adjustable along the first direction.

In an example, the connector further comprises elastic portions configured to allow the front frame and the rear frame being attached to each other along the first direction or being spaced with a tendency of being attached onto each other along the first direction.

In an example, each of the support portions comprises a screw disposed through corresponding portions of the front frame and the rear frame, respectively; and each of the elastic portions comprises a spring connected at corresponding locations of the front frame and the rear frame, respectively.

In an example, the elastic portions and the support portions are arranged at equal interval, respectively.

On another aspect, at least one embodiment of the present invention provides a display device comprising any of the above-described display device frameworks.

On yet another aspect, at least one embodiment of the present invention provides a display device comprising any of the above-described display device frameworks, wherein a display panel is supported on the rear frame of the display device framework, and an out-cell panel is supported on the front frame of the display device framework.

In an example, the out-cell panel comprises at least one selected from the group consisting of.

In an example, the out-cell panel comprises a view-angle adjusting baffle, and the view-angle adjusting baffle comprises a transparent substrate and a view-angle controlling layer disposed on at least one of an upper surface of the transparent substrate and a lower surface of the transparent substrate; wherein, the view-angle controlling layer comprises a plurality of light blocking trips, and the display panel comprises a plurality of black matrixes which is disposed in correspondence with the plurality of light blocking trips, respectively.

BRIEF DESCRIPTION OF THE DRAWINGS

In order to clearly illustrate the technical solution of the embodiments of the present invention, the drawings of the embodiments will be briefly described in the following, wherein.

Numeral References: 10—front frame; 11—out-cell panel; 20—rear frame; 21—display panel; 30—elastic portion; 40—support portion; 111—transparent substrate; 112—view-angle controlling layer.

DETAILED DESCRIPTION

In order to make objects, technical solutions and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
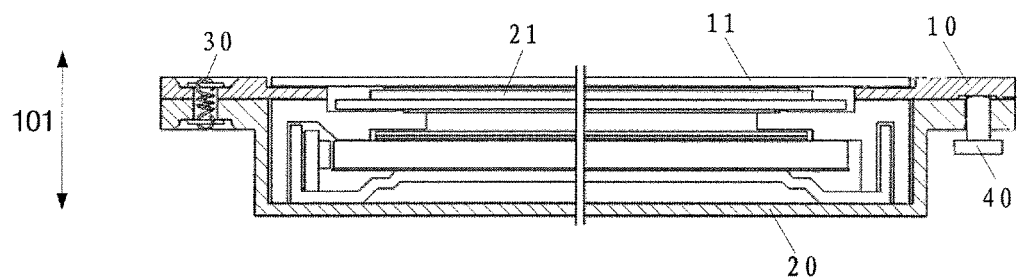
FIG. 1 is a schematic diagram of a display device framework as provided by an embodiment of the present invention, wherein a space d between a front frame and a rear frame satisfies d=0.
Figure 2:
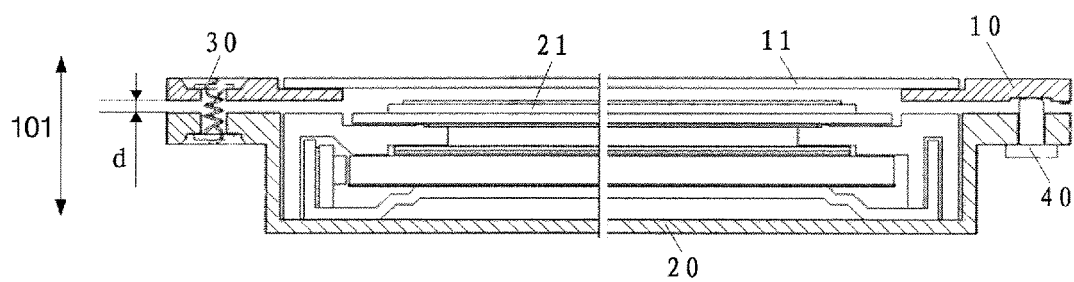
FIG. 2 is another schematic diagram of the display device framework as shown in FIG. 1, wherein the space d between the front frame and the rear frame satisfies d>0.

At least one embodiment of the present invention provides a display device framework as illustrated in FIG. 1 and FIG. 2, comprising a rear frame 20 configured to support at least a display panel 21 and a front frame 10 configured to support at least an out-cell panel; the front frame and the rear frame 20 are flexibly connected, and are movable with respective to each other along a direction (i.e., direction 101) which is perpendicular to the display panel 21 As illustrated in FIG. 2, a space between the front frame 10 and the rear frame 20 along the direction 101 is indicated by d, and the front frame 10 and the rear frame 20 are movable with respective to each other along the direction which is perpendicular to the display panel 21, that is, the space d is adjustable so as to satisfy particular demands of different users.

As illustrated in FIG. 1 and FIG. 2, in an embodiment where the out-cell panel 11 is a view-angle adjusting baffle, by way of example, the front frame 10 and the rear frame 20 are movable with respective to each other along the direction 101 which is perpendicular to the display panel 21; that is, the space d between the display panel 21 and the view-angle adjusting baffle 11 along the direction perpendicular to the display panel 21 is adjustable so as to further adjust a magnitude of the view angle of the display panel 21. With regard to particular embodiments of how to adjust the view angle by means of the view-angle adjusting baffle 11, reference can be made to the description in terms of the display device later.

Referring still to FIG. 1 and FIG. 2, in another embodiment where the out-cell panel 11 is/comprises a touch control panel, the above-mentioned space d between the front frame and the rear frame may be adjusted to a predetermined value so as to allow a space between the display panel 21 and the touch control panel 11 being sufficient to avoid any scratch there-between during transportation. For example, during transportation, the space d between the front frame and the rear frame may be increased to avoid any scratch between the touch control panel and the display panel; and during usage, the space d between the front frame and the rear frame may be decreased to ensure optimum effect of the touch control panel.

In an embodiment of the present invention, as illustrated in FIG. 1 and FIG. 2, the front frame 10 and the rear frame 20 are detachably connected. That is to say, the front frame 10 and the rear frame 20 can be assembled together in such a manner that they can be detached from one another; in this way, when either of the display panel and the out-cell panel goes wrong, it can be disassembled for repair by removing a corresponding frame.

In an embodiment of the present invention, for purpose of connection there-between, the front frame 10 and the rear frame 20 are provided with a plurality of connectors at corresponding locations; wherein the connector is adjustable so as to allow the front frame 10 and the rear frame 20 being movable with respective to each other along the direction 101 which is perpendicular to the display panel 21.

It should be explained that the connector is not particularly defined herein but can be implemented in any means well-known in the art which can realize a connection between the front frame and the rear frame and allow a relative movement between the front frame and the rear frame along a direction perpendicular to the display panel by means of adjustment. For example, the connector can be a stuck rod connecting the front frame and the rear frame, wherein the stuck rod is provided with a plurality of recesses along the length direction so that a relative distance between the front frame and the rear frame is adjustable by moving the front frame and/or the rear frame to be located at different recesses on the stuck rod.

Figure 3:
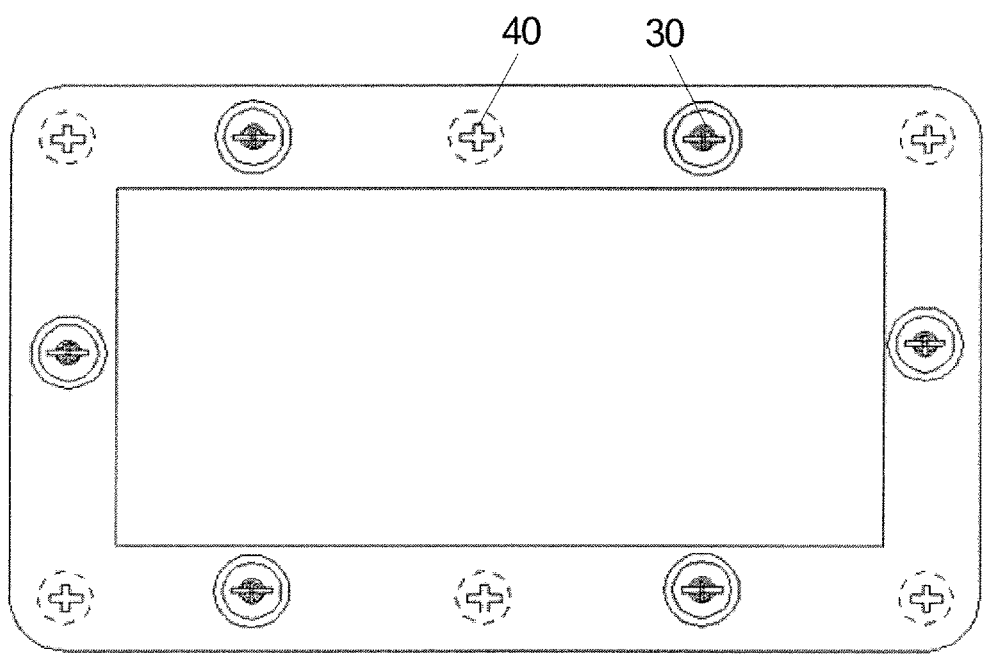
FIG. 3 is a rear view of the display device framework as shown in FIG. 1.

In an embodiment of the present invention, as illustrated in FIGS. 1-3, the connector comprises a support portion 40 configured to allow the front frame 10 and the rear frame 20 being spaced at a predetermined distance along a direction 101 which is perpendicular to the display panel 21.

In an embodiment of the present invention, the connector further comprises an elastic portion 30 configured to allow the front frame 10 and the rear frame 20 being attached onto one another along the direction 101 perpendicular to the display panel 21 or being spaced with a tendency of being attached onto one another.

In an embodiment of the present invention, the support portion 40 comprises a screw 40 disposed through corresponding portions of the front frame 10 and the rear frame 20, respectively; the elastic portion 30 comprises a spring 30 connected at corresponding locations on the front frame 10 and the rear frame 20, respectively. The elastic portion 30 is configured to allow the front frame 10 and the rear frame 20 being attached onto one another along a direction 101 perpendicular to the display panel 21 or being spaced with a tendency of being attached onto one another along the direction 101; in this case, the spring 30 that serves as the elastic portion is under a tensile state and hence applies a force on both the front frame 10 and the rear frame 20 to establish a tendency of pulling the front frame 10 and the rear frame 20 to be closer to each other along the direction 101 perpendicular to the display panel. It should be appreciated that in case where a space d between the front frame 10 and the rear frame 20 along the direction 101 perpendicular to the display panel 21 satisfies d=0, the elastic portion 30 is configured to allow the front frame 10 and the rear frame 20 being attached onto one another along the direction 101 perpendicular to the display panel 21; while in case where a space d between the front frame 10 and the rear frame 20 along the direction 101 perpendicular to the display panel 21 satisfies d>0, the elastic portion 30 is configured to allow the front frame 10 and the rear frame 20 being spaced with a tendency of being attached onto one another along the direction perpendicular to the display panel 21.

In an embodiment of the present invention, the elastic portion 30, cooperating with the support portion, is capable of stabilizing the front frame 10 and the rear frame 20. As illustrated in FIG. 1 and FIG. 2, an adjust to the support portion 40 can change the space d between the front frame 10 and the rear frame 20 along the direction 101 perpendicular to the display panel 21. In case where the screw 40 serves as the support portion and the spring 30 serves as the elastic portion, by way of example, when the screw 40 is driven in, the front frame 10 is lifted, as illustrated in FIG. 2, which increases the space d between the front frame 10 and the rear frame 20 along the direction 101; when the screw 40 is driven out, the front frame 10 is lowered, as illustrated in FIG. 1, which decreases the space d between the front frame 10 and the rear frame 20 along the direction 101 (the front frame 10 and the rear frame 20 are substantively attached onto each other). During this process, the spring 30 is always under a tensile state; that is to say, in order to restore elastic deformation, the spring 30 applies a tensile force on both of the front frame 10 and the rear frame 20, which allows the front frame 10 and the rear frame 20 being mutually tensed with a tendency of being attached onto each other. In addition, the spring 30 further prevents the front frame 10 and the rear frame 20 from separating due to vibration environment.

For more details, still referring to the embodiment as illustrated in FIG. 3 where the screw 40 serves as the support portion and the spring 30 serves as the elastic portion, by way of example, the screw 40 can be inserted through a via penetrating the rear frame 20 to lift the front frame 10; furthermore, the screw 40 can also serve to limit a degree of freedom of the rear frame 20 and the front frame 20 in a direction of a plane where the display panel 21 is located, and the spring 30 is always under a tensile state to tense both of the front frame 10 and the rear frame 20 so as to stable the same.

In an example, as illustrated in FIG. 3, a plurality of elastic portions 30, and similarly a plurality of support portions 40, are arranged at equal interval, respectively, so as to smoothly connect the front frame 10 and the rear frame 20; that is to say, a space between corresponding locations on the front frame 10 and the rear frame 20 is kept uniform along the direction perpendicular to the display panel 21.

Embodiments of the present invention further provide a display device comprising the display device framework provided by any of the above-described embodiments. In the display device, a display panel is supported on the rear frame of the display device framework. In some embodiments of the display device, an out-cell panel is further supported on the front frame of the display device framework.

In embodiments of the present invention, the display panel can be any one of or any combination of two of LCD, digital paper and Organic Light-Emitting Diode (OLED) display panel.

In embodiments of the present invention, the out-cell panel can be any one of or any combination of two of view-angle adjusting baffle, touch control panel and color filter, or can be other functional panel which allows the display panel achieving other functions, without particularly limiting herein.

In embodiments of the present invention, the rear frame supports the display panel which can be fixed on the rear frame by means of double faced adhesive tape, glue or screw so as to prevent the display panel from shaking. Similarly, the front frame supports the out-cell panel which also can be fixed on the front frame by means of double faced adhesive tape, glue or screw so as to prevent the out-cell panel from shaking. Of course, in some embodiments of the present invention, the display panel and the out-cell panel such as view-angle adjusting baffle can also be fixed at the rear frame and the front frame, respectively, by other mechanical means, without particularly limiting herein. Hereinafter the fixing of the panel at the frame will be described in details with reference to the use of double faced adhesive tape or glue by way of example.

Referring to the foregoing description of the display device framework, in embodiments of the present invention, the front frame and the rear frame are movable with respective to each other along a direction perpendicular to the display panel so as to allow a space between the display panel and the out-cell panel such as view-angle adjusting baffle being adjustable along the direction perpendicular to the display panel.

For example, during transportation of the display device, the space between the front frame and the rear frame can be adjusted to allow the display panel and the out-cell panel being spaced by a certain distance, so as to prevent from any scratch there-between. For another example, during usage of the display device, the space between the front frame and the rear frame can be adjusted according to actual demands of the space between the display panel and the out-cell panel, for better user experience.

Figure 4:
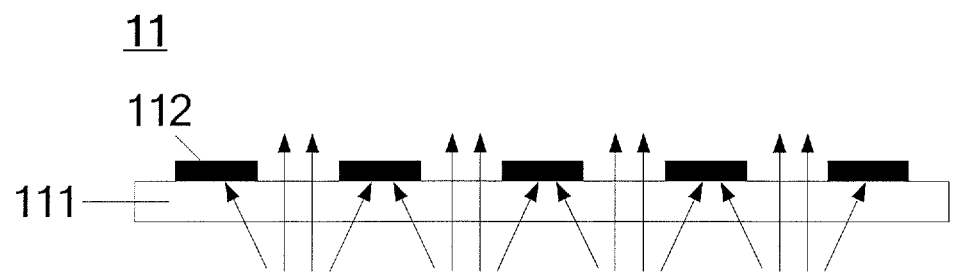
FIG. 4 is a schematic diagram of a view-angle adjusting baffle supported on the front frame of the display device framework in a display device comprising display device framework as provided by an embodiment of the present invention.

In an embodiment of the present invention, the out-cell panel 11 is a view-angle adjusting baffle. As illustrated in FIG. 4, the view-angle adjusting baffle 11 comprises a transparent substrate 111 and a view-angle controlling layer 112 disposed at an upper surface of the transparent substrate 111; the display panel 21 comprises a plurality of black matrixes, and the view-angle controlling layer 112 comprises a plurality of light-blocking strips which is arranged in correspondence with the plurality of black matrixes, respectively; in an example, the light-blocking strip can be sized corresponding to the black matrix. In this embodiment, the view-angle adjusting baffle disposed on the display panel allows the light that is emitted vertically from pixel regions to realize normal display and allows the light that is emitted at other angle with respective to the pixel regions to be absorbed by the light-blocking strips of the view-angle adjusting baffle, thereby narrowing the display view angle of the display panel.

Figure 5:
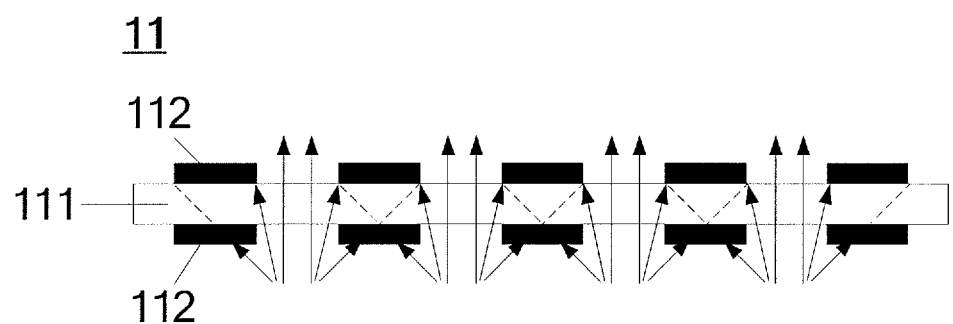
FIG. 5 is a schematic diagram of another view-angle adjusting baffle supported on the front frame of the display device framework in a display device comprising display device framework as provided by an embodiment of the present invention.

In another embodiment of the present invention, the view-angle controlling layer 112 of the view-angle adjusting baffle 11 is disposed at a lower surface of the transparent substrate 111. In still another embodiment of the present invention, as illustrated in FIG. 5, the view angle controlling layer 112 is disposed at both the upper surface and the lower surface of the transparent substrate 11; in this way, the light being transmitted through the view-angle controlling layer disposed at one side of the transparent substrate will be partly absorbed, which narrows the view angle; then the light being transmitted through the view angle controlling layer disposed at the other side of the transparent substrate subsequently will also be partly absorbed, which further narrows the view angle.

Figure 6:
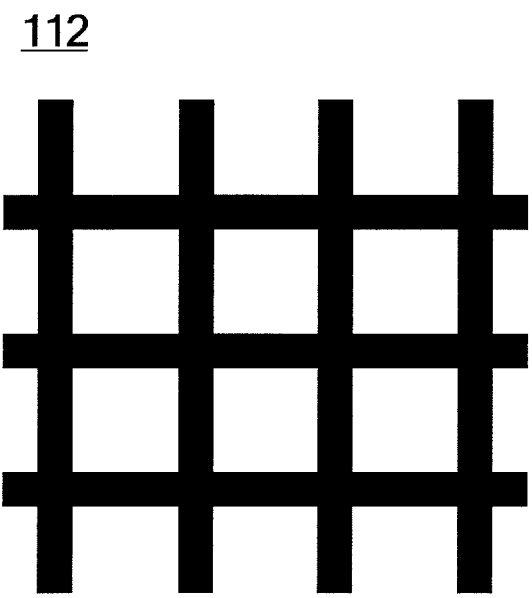
FIG. 6 is a schematic diagram of a view-angle controlling layer of the view-angle adjusting baffle supported on the front frame of the display device framework in a display device comprising display device framework as provided by an embodiment of the present invention.

It should be explained that the display panel achieves the function of display by means of a plurality of pixels, so it usually disposes a black matrix at a location between adjacent pixels to avoid light leakage. In some embodiments of the present invention, the light-blocking strips in the view-angle controlling layer 112 of the view-angle adjusting baffle 11 are disposed at locations corresponding to that of the black matrixes of the display panel, respectively; for example, as illustrated in FIG. 6, the light-blocking strips are intersected vertically and horizontally so as to be corresponding to the locations of the black matrixes disposed between adjacent pixels of the display panel.

The terms "upper (top)" "lower (bottom)" as used herein are defined with reference to the direction along which the light is emitted from the display panel; that is, the light-incident side is referred to as the lower side, while the light-emitting side is referred to as the upper side.

Figure 7:
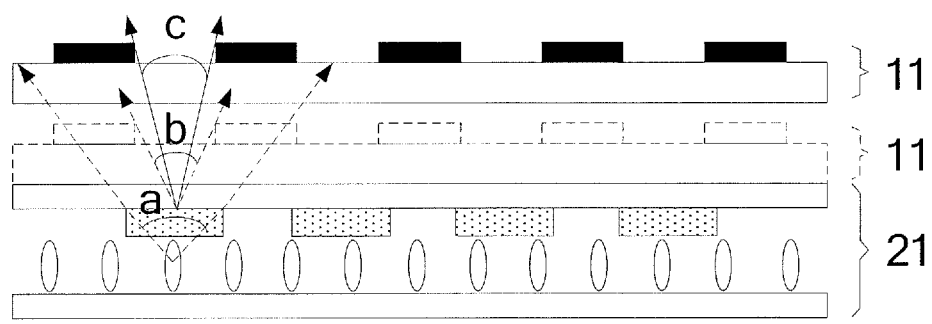
FIG. 7 is a schematic diagram of a space between the view-angle adjusting baffle supported on the front frame of the display device framework in a display device comprising display device framework and the display panel supported on the rear frame of the display device framework versus the view angle of the display device.

As illustrated in FIG. 7, the display device as provided by embodiments of the present invention comprises a LCD panel 21 and a view-angle adjusting baffle 11, by way of example. Prior to mounting the view-angle adjusting baffle 11 at the front frame 10, each of the pixels has a maximum view angle of a. Upon mounting the view-angle adjusting baffle 11 at the front frame 10 and allowing the view-angle adjusting baffle 11 being attached onto the LCD panel 21 by adjusting the space d to satisfy d=0, each of the pixels has a maximum view angle of b which satisfies b<a; Moreover, upon adjusting the space d between the view-angle adjusting baffle 11 and the display panel 21 to satisfy d>0, each of the pixels has a maximum view angle of c which satisfies c<b. The larger the space d between the view-angle adjusting baffle 11 and the display panel 21 is, the smaller the maximum view angle of each of the pixels will be, that is, the smaller the display view angle of the display device will be.

As above, in the display device as provided by an embodiment of the present invention, the display panel is supported by the rear frame, and the view-angle adjusting baffle is supported by the front frame; in this way, since the front frame and the rear frame are movable with respective to each other along a direction perpendicular to the display panel, a space between the display panel and the view-angle adjusting baffle is changeable, and hence the view angle of the display device is adjustable by changing the space between the front frame and the rear frame along the direction perpendicular to the display panel, so as to meet different demands.

The foregoing embodiments are merely used for explaining the technical solution of the present invention, and not intended to limit the present invention; although the present invention is explained in detail with reference to the foregoing embodiments, those of ordinary skill in the art will readily appreciate that many modifications are possible in the foregoing embodiments, or equivalent substitutions are made for part of technical features; however, these modifications or substitutions are not intended to make the essences of the corresponding technical solutions depart from the spirit and the scope of the technical solutions of the embodiments of the present invention.

The present application claims priority of Chinese Patent Application No. 201510084070.4 filed on Feb. 16, 2015, the disclosure of which is incorporated herein by reference in its entirety as part of the present application.

What is claimed is:

1. A display device, comprising:
   a display device framework, wherein the display device framework comprises:
   a rear frame, configured to support at least a display panel; and
   a front frame, configured to support at least an out-cell panel, wherein, the front frame and the rear frame are flexibly connected so as to be movable with respective to each other along a first direction, wherein the first direction is perpendicular to the display panel upon the display panel being supported;
   the display panel, supported on the rear frame; and,
   the out-cell panel, supported on the front frame,
   wherein the out-cell panel comprises a view-angle adjusting baffle, and the view-angle adjusting baffle comprises a transparent substrate and a view-angle controlling layer disposed on at least one of an upper surface of the transparent substrate and a lower surface of the transparent substrate, wherein the view-angle controlling layer comprises a plurality of light blocking strips; the display panel comprises a plurality of black matrixes, and wherein the plurality of light blocking strips is disposed in correspondence with the plurality of black matrixes, respectively,
   the front frame and the rear frame are flexibly connected through a plurality of connectors disposed at corresponding locations on the front frame and the rear frame respectively;
   the connectors compromise: support portions configured to provide a predetermined space between the front frame and the rear frame, wherein the predetermined space is adjustable along the first direction; and elastic portions configured to allow the front frame and the rear frame being attached onto each other along the first direction or being spaced with a tendency of being attached onto each other along the first direction,
   each of the support portions comprises a screw disposed through corresponding portions of the front frame and the rear frame respectively; and each of the portions comprises a spring connection at corresponding location of the front frame and the rear frame respectively.

2. The display device framework of claim 1, wherein the elastic portions and the support portions are arranged at equal interval, respectively.

* * * * *